United States Patent [19]

Godwin et al.

[11] Patent Number: 5,220,476
[45] Date of Patent: Jun. 15, 1993

[54] NON-ERASABLE MAGNETIC DATA STORAGE METHOD

[76] Inventors: Jimmy D. Godwin, 3369 Walton Way, San Jose, Calif. 95117; Roger O. Williams, 47267 Rancho Higuera, Fremont, Calif. 94539; Stephen P. Williams, 571 Creekside La., Morgan Hill, Calif. 95037

[21] Appl. No.: 608,338

[22] Filed: Nov. 2, 1990

[51] Int. Cl.⁵ ............................................. G11B 5/09
[52] U.S. Cl. ...................................................... 360/60
[58] Field of Search ........................................... 360/60

[56] References Cited

U.S. PATENT DOCUMENTS

| | | | |
|---|---|---|---|
| 3,373,997 | 3/1968 | Berndt et al. | 274/42 |
| 3,753,252 | 8/1973 | Tietze | 340/174.1 G |
| 4,584,641 | 5/1986 | Guglielmino | 364/200 |
| 4,802,050 | 1/1989 | Miyabayashi et al. | 360/135 |
| 4,961,123 | 10/1990 | Godwin et al. | 360/161 |

Primary Examiner—Vincent P. Canney
Attorney, Agent, or Firm—Michael J. Hughes

[57] ABSTRACT

A method for inscribing data onto a magnetic medium (12) wherein portions of an oxide coating (16) of the medium are removed from the medium (12) to create voids (88) while the oxide coating (16) is left undisturbed on areas adjacent to the voids (88). The adjacent areas are then uniformly magnetized. When the medium is moved past a read head (78), changes in magnetic field present at transition points (82) and (84) between the voids (88) and the uniformly magnetized oxide coating (16) of adjacent areas cause a current to be induced in a coil (80) of the read (78) head which current is interpreted by conventional read circuitry as being a data bit. The data inscribed by this method is not erasable by conventional means. The inventive method may be practiced upon selected portions of a medium (12) such that non-erasable data areas and conventional magnetically erasable data areas can coexist on the same medium (12).

19 Claims, 3 Drawing Sheets

NON-ERASABLE MAGNETIC DATA STORAGE METHOD

TECHNICAL FIELD

The present invention relates generally to magnetic data storage media, and more particularly to a method for placing data on a magnetic data storage medium, which data cannot be erased or altered in normal use. The predominant current usage of the non-erasable magnetic data storage method of the present invention is in the storage of permanent alignment data and the like on rotating magnetic media.

BACKGROUND ART

The recording of data in binary form by means of alteration of a magnetic field on portions of a medium surface is well known in the art. Moreover, the use of rotating magnetic media such as in floppy diskettes and in rigid disk drives is widely practiced. Recording of data on magnetic media is accomplished by using a read/write head to polarize the magnetic fields of particles on a medium in one of two distinguishable orientations, such that a transition between such orientations indicates either a timing pulse or a data bit (one), and no transition at a data bit location indicates a no data bit (zero). To retrieve the written data, the disk is rotated past the read/write head such that the previously aligned fields induce currents in the read/write head corresponding to the previously recorded data. When there is a constant magnetic field, no indication of recorded data is produced. These general principles for recording and retrieving data from rotating magnetic media pertain to rigid (hard disk) media as well as to floppy disks. The most common field orientation scheme for recording data on rotating magnetic media is to cause consecutive fields to be polarized alternately in the direction of rotation of the medium and then opposite to such direction, such that passing a transition between two contiguous oppositely polarized areas over a read/write head gap induces a current through the read/write head coil which can serve as an indication of a data bit. A variation of this scheme to increase data capacity has been to orient the magnetic fields perpendicularly to the medium surface rather than across its surface. This method, also, operates by means of detecting the transition from one orientation to another to indicate a data bit.

Variations of these same principles for recording and reading magnetic media also apply to the use of magnetic tapes as well as to the magnetic strips on credit cards and similar data cards. In most cases, a transition between field states, as described above, is used to indicate a data bit (one) while a no transition, or steady state, is used to indicate a no data bit (zero).

A problem that has continued to plague users of magnetic data storage media has been that information contained on such media can be inadvertently erased, either by operator error when using the media or by accidentally placing the media within the influence of a strong magnetic field. Obviously, it would be desirable to have magnetically readable data that could not be erased. If such data could be combined on a medium surface with areas which could be written to and erased in a normal manner, even more benefit could be derived.

One method that is known in the art for placing permanent reference marks and the like on a magnetic medium is to remove the magnetic material from an area of the medium such that a magnetic field cannot be established thereon. An example of this is found in U.S. Pat. No. 4,961,123 issued to Godwin et al.. However, all such prior art techniques resulted only in the establishment of mechanical reference tracks, servo reference marks, or gross areas of intentional permanent random error. Prior to the resent invention, no means has been found for using this general technique to create actual data on a medium surface.

All of the prior art methods for placing data on a magnetic storage medium within the inventor's knowledge have resulted in data which can be erased either inadvertently or intentionally.

No prior art method for placing data on a magnetic storage medium to the inventor's knowledge has successfully produced data which cannot be erased magnetically. All successful methods for writing data to magnetic media have resulted in stored data which can be magnetically erased.

DISCLOSURE OF INVENTION

Accordingly, it is an object of the present invention to provide a means for recording non-erasable data on the surface of a magnetic data storage medium.

It is another object of the present invention to provide non-erasable data which can be read by conventional magnetic data retrieval apparatus.

It is still another object of the present invention to provide a means for intermixing erasable and non-erasable data on the same data storage medium.

It is yet another object of the present invention to provide a means for recording data on a magnetic data storage medium which can be visually verified by means of optical magnification to be in a correct physical location on the medium.

It is still another object of the present invention to provide a means for placing data on the surface of a magnetic data storage medium which cannot be inadvertently overwritten or destroyed by magnetic fields.

Briefly, the preferred embodiment of the present invention is a method for recording indelible (non-erasable) data on magnetic media by using a focused spot of laser light as a tool to precisely machine away the magnetic layer of iron oxide from the surface of the magnetic media. The magnetic layer contains the iron oxide particles which are magnetized by the read/write had and contain the magnetic fields for recorded data.

The spot of laser light used in the process has a wavelength of 830 nanometers. It is focused to approximately a 2 micrometers diameter spot and contains about 4 to 8 milliwatts of optical power. The spot of light is scanned over the surface of the disk at a velocity of 50 millimeters per second for a distance equal to the length of the magnetic bit. A typical magnetic bit for a standard Double Density (DD) 5¼" floppy diskette is about 0.3 millimeters wide and 4 to 7 micrometers long. To make an equivalent non-erasable bit requires the laser spot to scan the width, step 2 micrometers, then scan again. This process is repeated until the complete width of the non-erasable bit has been covered. The magnetic coating of a DD 5¼" floppy diskette is about 2.5 micrometers thick. The focused laser light will remove the coating leaving a void in the surface of the media.

In the best presently known embodiment of the invention, a steel weight plate is used to hold the medium disk flat and at the focal spot of the laser. An alternative method for practicing the invention makes use of dynamic focusing means which are present within the laser head assembly to eliminate the need for the steel weight plate, and thus to speed up the process.

To read back the non-erasable data, the diskette is first uniformly polarized by a permanent magnet or by a read/write head in a floppy disk drive. After being magnetically polarized, all the magnetic flux fields are oriented in the same direction. However, the areas where the iron oxide layer has been carved away will have no magnetic field, or a lesser magnetic field. As a magnetic head passes over the non-erasable bit, it will detect a disruption in the flux field density as it passes from a magnetic to non-magnetic region. This results in a machine readable data bit.

Since the void cannot be erased, it can be used as permanent data on the disk. A software algorithm can be written which will attempt to overwrite this data. If the data does not change when read back, then the system can be certain that the disk in the drive is an original and not a copy.

Conventional magnetic data cannot be seen by the eye without destroying the disk. Since the non-erasable data bit is physically in the surface of the disk it can be seen under a microscope. If the disk is to be used as an alignment disk, it has the advantage of being capable of being easily certified for correct mechanical position of the features.

The present invention, as described herein, is a magnetic medium having thereon indelible data created according to the inventive process. In order to best demonstrate the inventive process and thus to describe the inventive improved magnetic medium, the process is described herein by disclosing the hardware utilized in the process and the manner in which it is used in accomplishing the process and in creating the inventive improved medium.

An advantage of the present invention is that non-erasable data can be placed on a magnetic data storage medium.

A further advantage of the present invention is that non-erasable data can be read by conventional magnetic data retrieval apparatus.

Yet another advantage of the present invention is that erasable and non-erasable data may be intermixed on the same data storage medium.

Still another advantage of the present invention is that recorded data is visible and thus can be verified as to correct physical location on a medium by optical means.

Yet another advantage of the present invention is that data placed on a magnetic data storage medium cannot be inadvertently overwritten or destroyed by magnetic fields.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT INVENTION

The best presently known mode for carrying out the invention is by means of an apparatus for modifying, according to the present inventive method, a 5¼ inch floppy diskette such as is commonly used for storing computer readable data, to contain non-erasable data fields. The predominant expected usage of the inventive method for placing non-erasable data on magnetic data media is in the data processing industry, particularly in the field of the manufacture of diskettes containing protected software or alignment data wherein protection from erasure of certain data is desirable.

Figure 1:
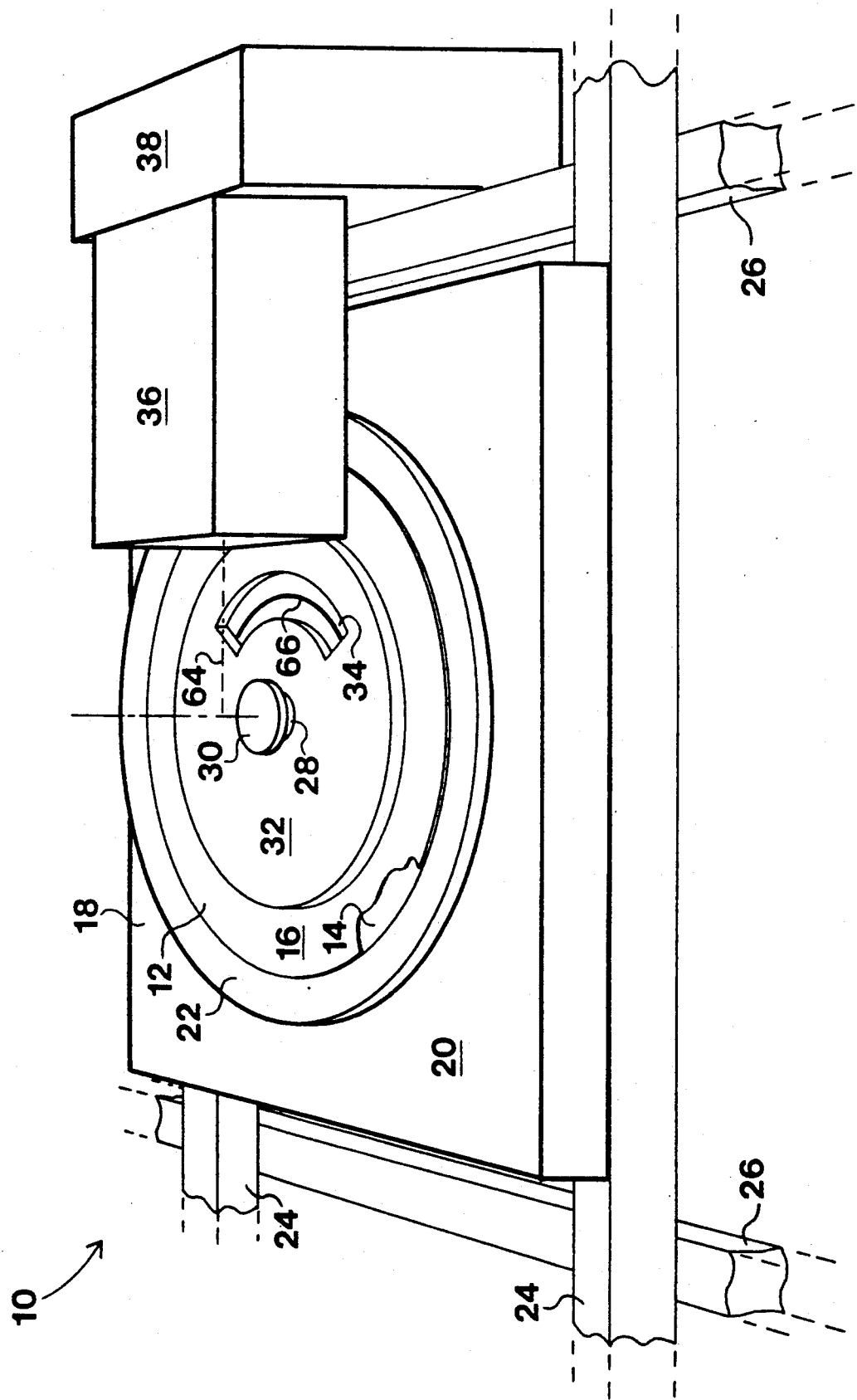
FIG. 1 is a perspective view of a stylized apparatus for placing non-erasable data on a magnetic disk, according to the present inventive method.

The data inscribing apparatus of the presently preferred embodiment of the present invention is illustrated in a perspective view in FIG. 1 and is designated therein by the general reference character 10. A medium disk 12 (in this instance, a 5¼ inch floppy disk medium) having a mylar substratum 14 and an oxide coating 16 provides the object upon which the inventive method is to be accomplished. The medium disk 12 is placed on a turntable 18 having a movable stage 20 and a rotating table 22. The movable stage 20 can be positioned in two dimensions by means of a pair of radial positioning rails 24 and a pair of lateral positioning rails 26. The combination of the radial positioning rails 24 and the lateral positioning rails 26 is a well known means for accurately positioning items, and is not peculiar to the present invention.

A hub 28, which is an aperture at the center of the rotating table 22 provides the center about which the rotating table 22 can rotate. A removable centering spool 30 is placed within the hub 28 to keep the medium disk 12 centered on the rotating table 22. A weight plate 32 is placed upon the medium disk 12 to insure that the medium disk 12 lies flat upon the rotating table 22 and does not move in relation thereto. An aperture 34 is provided in the weight plate 32 to enable the inventive method to be practiced upon that portion of the medium disk 12 which is exposed through the aperture 34. Of course, the location of the aperture 34 is entirely dependent upon the instant application of the inventive method, and the location on the medium disk 12 upon which it is desired to place non-erasable data.

A laser head assembly 36 is held in place over the turntable 18 by means of a fixed laser head mount 38. The fixed laser head mount 38 holds the laser head assembly in a fixed position relative to the lateral positioning rails 26. As can be seen in the drawing of FIG. 1, by proper manipulation of the combination of the movable stage 20, the positioning rails 24 and 26, and the rotating table 22, any portion of the medium disk 12 may be accurately positioned under the laser head assembly 36. In prototype apparatus for practicing the present invention, positioning of the medium disk 12 was accomplished manually by adjusting the movable stage 20, the positioning rails 24 and 26, and the rotating table 22 and, indeed, the inventive method may be practiced in this manner. However, the best presently known embodiment 10 of the inventive apparatus has incorporated motorized versions of the movable stage 20, the positioning rails 24 and 26, and the rotating table 22 in order that the medium disk 12 might be accurately positioned repeatedly under computer control. An ordinary personal computer (not shown) is employed for the purpose. The connections between the computer (not shown) and the best presently known embodiment 10 of the inventive apparatus are all entirely conventional, and the technique for positioning the medium disk 12 under computer control is entirely within the knowledge of one skilled in the art.

Figure 2:
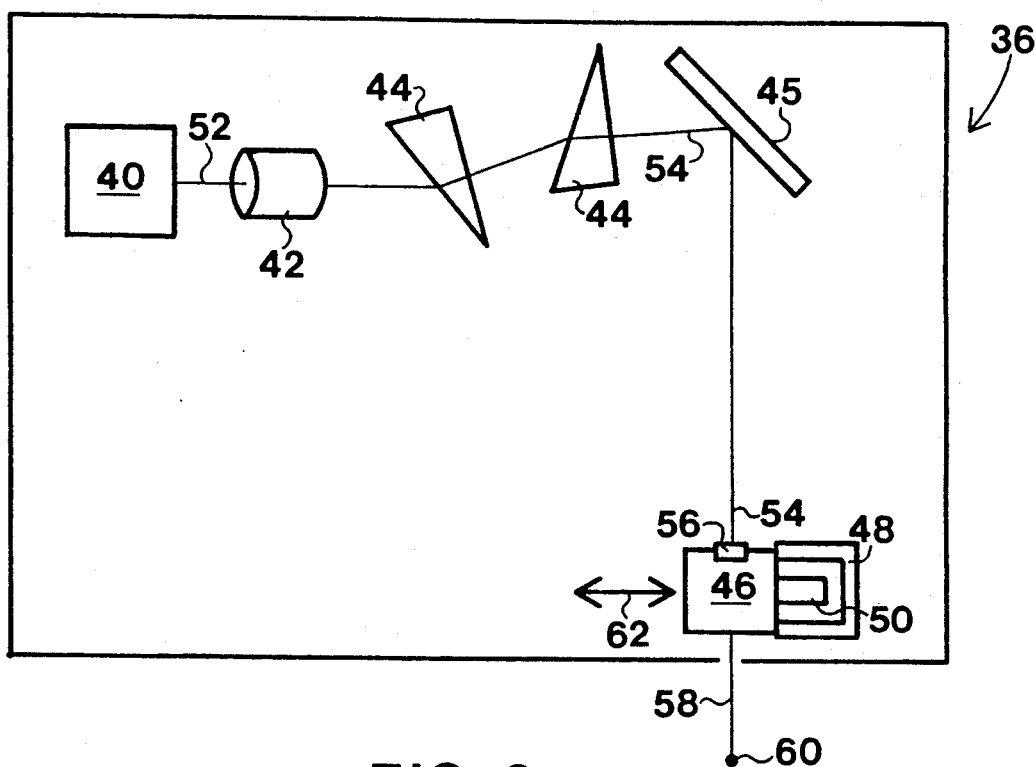
FIG. 2 is a diagrammatic representation of a laser head assembly as used in practicing the present inventive method.

Referring now to FIG. 2, wherein is shown a diagrammatic representation of a side elevational view of the laser head assembly 36. The laser head assembly 36 is a conventional device which is ordinarily used in the optical media data storage industry for writing and reading data on optical media. The laser head assembly 36 has not been modified by the inventors. The laser head assembly 36 has a diode laser emitter 40, a collection lens 42, two correction prisms 44, a routing mirror 4$, an objective lens 46, a focusing motor 48, and a scanning motor 50.

In the presently preferred embodiment 10 of the inventive apparatus, the diode laser emitter 40 produces a laser beam 52 having a maximum 20 milliwatts of power at a wavelength of 830 nanometers. The laser beam $2 is directed through the collection lens 42 and emerges as a collimated beam having an elliptical cross section. The correction prisms 44 are anamorphic correction prisms which produce a corrected laser beam 54 having a circular cross section with a diameter of 4.5 millimeters. The routing mirror 45 serves to bend the light path 90 degrees. The focusing motor 48 moves the objective lens 46 so as to focus the corrected laser beam 54 as desired. The objective lens 46 has an entrance pupil 56 of 4.3 millimeters diameter and produces a reduced diameter laser beam 54 focused to a focal spot 60 approximately 2 micrometers in diameter and about 2.6 millimeters from the objective lens 46.

The scanning motor 50 is a voice coil type motor for causing the objective lens 46 to move perpendicularly to the corrected laser beam 54 along a scanning axis 62. Under computer control, the scanning motor 50 is driven by a sine wave signal to cause the objective lens 46 to move in a parallel fashion with respect to the scanning axis 62 with a maximum excursion of approximately 1.5 millimeters at a rate of 45 Hz.

Referring again to FIG. 1, in order to accomplish the objective of removing only selected portions of the oxide coating 16 from the medium disk 12, the medium disk 12 is positioned precisely under the objective lens 46 (FIG. 2) so that the scanning axis 62 is aligned with a disk radial axis 64 of the medium disk 12. As one skilled in the art will recognize, this alignment means that the scanning motor 50 will cause the reduced diameter laser beam 58 to scan radially across a track location 66 of the medium disk 12. Note that the track location 66 is shown in the drawing of FIG. 1 for reference purposes only, since the tracks themselves are not visually manifested on the medium disk 12.

Figure 3:
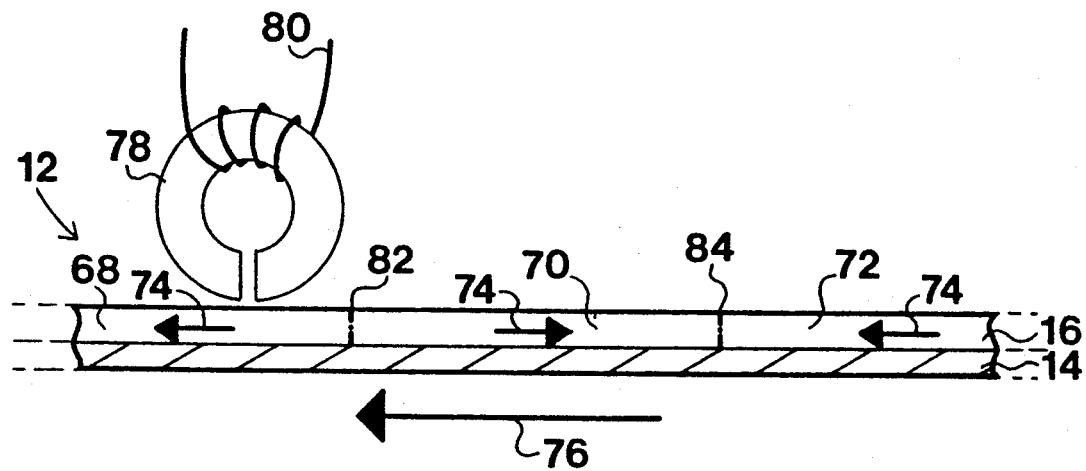
FIG. 3 is a cross sectional representation of a portion of a conventional magnetic medium, showing flux orientation.

Referring now to FIG. 3, wherein is shown a cross sectional elevational diagram of a portion of the medium disk 12, the medium disk 12 is shown partially cut away so that a portion of the track 66 (FIG. 1) can be seen. It can be seen that the mylar substratum 14 is covered with the oxide coating 16, which is shown in FIG. 3 to be divided into a first field area 68, a second field area 70 and a third field area 72. Within each of the field areas is shown a field orientation indicator 74. The field orientation indicators 74 are used in the drawing of FIG. 3 to represent field orientation within the field areas 68, 70 and 72. Of course, the field areas 68, 70 and 72 are not visually distinguishable on the medium disk 12, nor are the field orientations as represented herein by the field orientation indicators 74.

As can be seen in the drawing, the first field area 68 is magnetized in the same direction as a direction of rotation 76 of the medium disk 12. The second field area 70 is magnetized opposite to the direction of rotation 76, and the third field area 72 is, like the first field area 68, magnetized in the direction of rotation 76. In normal operation, the medium disk would be rotated past a read head 78, which would result in a current being induced in the head coil 80 at a first transition point 82 and a second transition point 84. One skilled in the art will recognized that, depending upon the data encoding scheme used, the first transition point 82 and the second transition point 84 might represent either timing marks indicating bit cell boundaries, or data points. This distinction is not relevant to the present invention, since these distinctions are made by associated timing and data interpretation circuitry structures which are unaffected by the present invention. Manifestations within the oxide coating 16 of the field areas 68, 70 and 72 and the transition points 82 and 84 are identical in either case.

Figure 4:
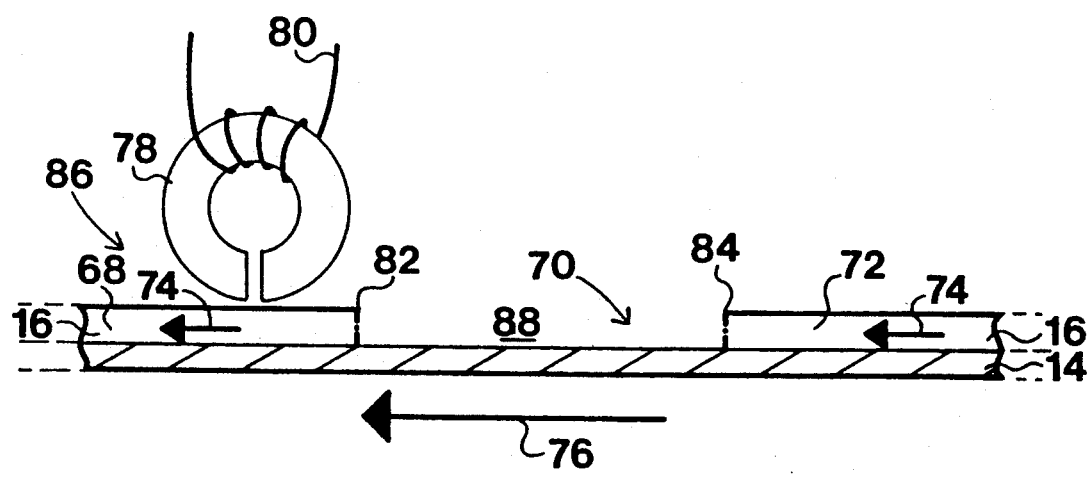
FIG. 4 is a cross sectional representation of a magnetic medium modified to contain non-erasable data, according to the present invention.

FIG. 4 is a diagrammatic representation of a modified medium disk 86 shown in the same view as is the medium disk 12 of FIG. 3. However, FIG. 4 depicts the track 66 (FIG. 1) as modified according to the present invention. The modified medium disk 86 of FIG. 4 also has the mylar substratum 14, covered by the oxide coating 16. Also, as in FIG. 3, the first field area 68, the second field area 70 and the third field area 72 can be seen. However, in FIG. 4, it can be seen that the oxide coating 16 has been removed from the second field area 70 of the modified medium disk 86 leaving a void 88, while the oxide coating 16 remains in the first field area 68 and the third field area 72. Thus, on the modified medium disk 86, the first transition point 82 and the second transition point 84 represent boundaries between the oxide coating 16 and the void 88, whereas in the unmodified medium disk 12 of FIG. 3, the first transition point 82 and the second transition point 84 represent boundaries between pairs of oppositely polarized field areas (field areas 68 and 70, and field areas 70 and 72). Nevertheless, when the disk is rotated in the direction of rotation 76 past the read head 78, a current pulse will be induced in the head coil 80 at the first transition point 82 and the second transition point 84. The inventors have found that signal magnitude resulting from the reading of the modified medium disk 86 (FIG. 4) is approximately 60% of that produced by reading the medium disk 12 (FIG. 3). However, this presents no obstacle to the reading of the modified medium disk 86 by conventional disk drives, as this still results in more than sufficient signal magnitude, particularly since conventional automatic gain control circuitry will, in most cases, compensate for this difference. Having now seen the best presently known embodiment 10 for carrying out the invention, and having also having seen an example of the modified medium disk 86, one skilled in the art can appreciate that the process for producing the modified medium disk 86 using the best presently known embodiment 10 is a matter of properly positioning the medium disk 12 at the focal spot 60 (FIG. 2) of the laser head assembly 36 and then causing the objective lens 46 to scan the focal spot 60 so as to carve out a desired portion of the oxide coating 16. It should be noted that the oxide coating 16 is made of several ingredients including oxide particles and polymer binders. The inventors have found that by pulsing the diode laser emitter 40 at 1 MHz there is sufficient energy induced to exceed the flash point of the polymer binders, and thus to cause the removal of that portion of the oxide coating 16, and yet not excessive energy such that too much residual heat is produced, thus causing any undesired harm to the medium disk 12. The above described process is repeated until a void 88 is created in all areas of the oxide coating 1 6 in which a void 88 is desired.

In the best presently known embodiment 10 of the invention, further control of the heating of the oxide coating 16 is provided by adjustment of the duty cycle of the laser modulation. The diode laser emitter 40 is driven at 105 milliamps which yields about 4 milliwatts at the medium disk 12. Since the scanning motor 50 is driven by a sine wave, the linear velocity of the focal spot 60 will vary through its cycle. The velocity of the objective lens 46 is greatest during the middle portion of the cycle, and so the modulation duty cycle is controlled to be 50% at that time.

At the ends of the cycle, linear velocity goes to zero, and thus less laser power need be applied to vaporize the oxide coating 16 at that point. Therefore, in the best presently known embodiment 10 of the invention, the duty cycle of the diode laser emitter 40 is controlled to decrease as a sine function from 50% at zero crossing points of the objective lens 46 to 5% at extremes of travel of the objective lens 46.

Of course, the exact locations on the medium disk 12 from which it is desired to create the voids 88 (FIG. 4) will vary with the application. Selection of such locations is entirely within the prior art, as such areas could be all of those field areas such as the field areas 68, 70 and 72 (FIG. 3) which would normally be polarized in the direction of rotation 76. Alternatively, the void 88 could be created in all of those field areas such as the field areas 68, 70 and 72 (FIG. 3) which would normally be polarized opposite to the direction of rotation 76. In the presently preferred embodiment 10 of the invention, the medium disk 12 can be positioned to within 0.25 micrometers linear movement and to within 4 arc seconds (±2 arc seconds) of rotation. The inventors have found that this is sufficiently accurate to position the medium disk 12 for a 5¼ inch high density floppy diskette.

In the operation of the best presently known embodiment 10 (FIG. 1) of the invention, after the medium disk 12 is loaded onto the rotating table 22, the weight plate 32 is positioned on the medium disk 12 and the centering spool 30 is inserted into the hub 28. The medium disk is then positioned by means of the positioning rails 24 and 26 under computer control. The scanning motor So is then started and allowed to stabilize, and the diode laser emitter 40 is pulsed as previously described herein. Thus, the void 88 (FIG. 4) is created and, if desired, the medium disk 12 is repositioned and the process is repeated.

Figure 5:
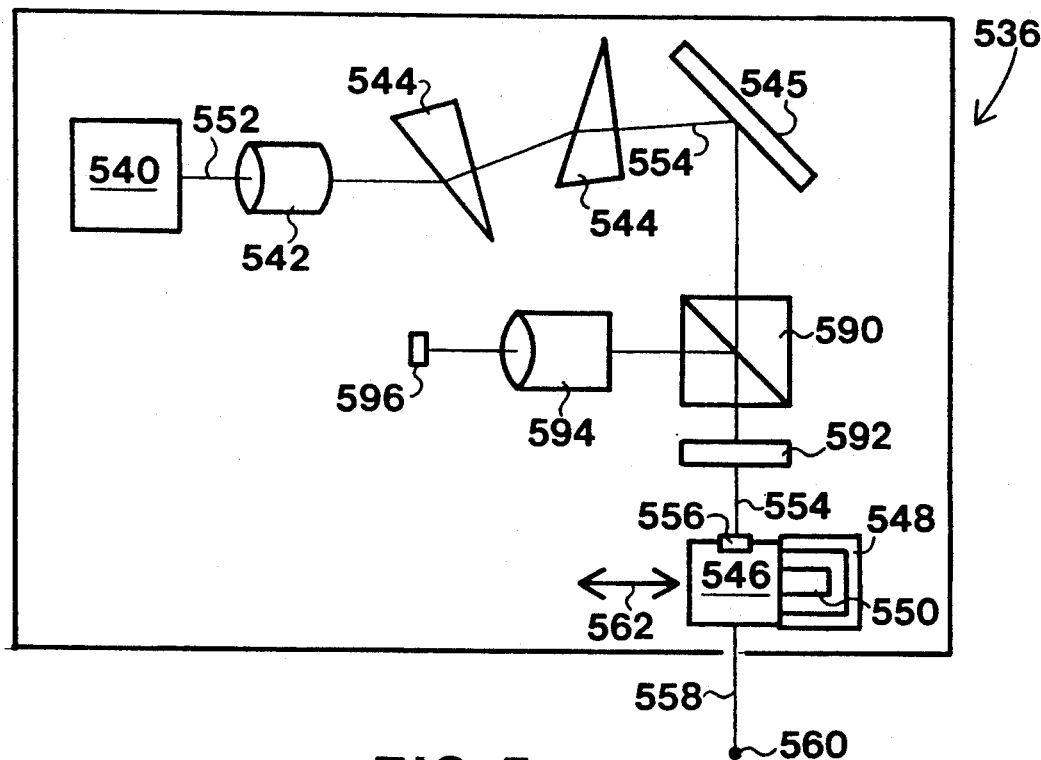
FIG. 5 is a diagrammatic representation of the laser head assembly depicted in FIG. 2, showing additional components which are used in an alternative method for practicing the invention.

An alternative method for using the best presently known embodiment 10 of the invention makes use of components present in the laser head assembly 36, but not heretofore discussed. FIG. 5 depicts an alternate laser head assembly 536 which is identical to the laser head assembly 36 (FIG. 2) with the exception that it includes components which were neither used in the first preferred method of practicing the invention nor depicted in FIG. 2. . For clarity in designating the elements of the alternate laser head assembly 536, those elements which are common with the laser head assembly 36 will be designated by the same reference numeral as before except that 500 will be added to the numeral. The alternate laser head assembly 536 has a diode laser emitter 540, a collection lens 542, two correction prisms 544, a routing mirror 545, an objective lens 546, a focusing motor 548 and a scanning motor 550. The alternate laser head assembly 536 also has a polarization beam splitter 590, a quarter wave plate 592, a cylindrical and focusing lens unit 594 and a quadrant detector 596. The polarization beam splitter 590, the quarter wave plate 592, the cylindrical and focusing lens unit 594 and the quadrant detector 596 are contained in the laser head assembly 36 (FIG. 2) as described heretofore, however these components were not discussed previously as they are not used in the method previously described for using the best presently known embodiment 10 of the invention. However, the inventors have found that an equally preferred alternate method for using the best presently known embodiment 10 of the invention, which is somewhat more complex but Which may be somewhat faster for purposes of mass production, does employ these components, as described below.

In order to dispense with the use of the weight plate 32 (FIG. 1), the inventors have discovered that the focus of the alternate laser head assembly $36 can be corrected sufficiently to compensate for any deviation in distance between the laser head assembly 536 and the medium disk 12 (FIG. 1) which might result from the fact that the medium disk 12 is not held flat by the weight plate 32. As can be seen in the drawing of FIG. 5, the corrected laser beam 554 passes through the polarization beam splitter 590. The polarization of the corrected laser beam 554 is such that it passes through the polarization beam splitter 590, and is unaffected thereby.

The corrected laser beam 554 then passes through the quarter wave plate 592 to the focal spot 560. When the corrected laser beam 554 encounters the oxide coating 16 (FIG. 1), a portion is reflected back. As one skilled in the art will recognize, the cumulative effect of passing the corrected laser beam 554 twice through the quarter wave plate 592 is to cause a ninety degree rotation in linear polarization such that the reflected corrected laser beam 554 will be directed by the polarization beam splitter 590 through the cylindrical and focusing lens unit 594 and into the quadrant detector 596. The quadrant detector 596 then detects any out of focus condition in a manner known as "astigmatic focus detection". This is a common method for deriving focus error information known to those skilled in the art. The quadrant detector 596 then generates a signal for controlling the focusing motor 548 in order to focus the corrected laser beam 558. It should be noted that the above described alternate method for practicing the invention is an application of existing circuitry in the alternate laser head assembly 536 and is disclosed herein in the interest of providing an equally preferred alternative method for utilizing the best presently known embodiment 10 of the invention.

One skilled in the art will recognize that the polarization of remaining portions of the oxide coating 16 adjacent to the void 88 is not critical, since the transition from the void 88 to the polarized field area 72 as depicted in FIG. 4 will result in an indication of a data bit regardless of the direction of the field orientation indicator 74. Therefore, if the modified medium disk 88 is to contain only non-erasable data, it can simply be exposed to a magnetic field to complete the inventive process of creating non-erasable data. Alternatively, if the modified medium disk 12 is to contain both the inventive non-erasable data and conventional magnetically erasable data, then the areas of the disk 12 wherein the transition points 82 and 84 are located can be magnetized by conventional magnetic disk drive writing apparatus.

As is shown above, the data inscribing apparatus 10 according to the present invention utilizes a combination of a conventional laser device developed for use with optical media and conventional positioning apparatus. The substantial difference exists in the combination, which is an entirely new and unique approach to data storage. No significant changes of materials are envisioned nor are any special constructions required.

While the embodiments of the invention described herein create non-erasable data by essentially completely carving away portions of the oxide coating 16 from the medium disk 12, it is important to note that the invention could be practiced with considerably less than such complete removal. For instance, if only approximately half of the depth of the oxide coating 16 were removed from selected locations, the purpose of creating non-erasable data would still be accomplished. This is because conventional read circuitry on disk drives and the like require considerably less than a total flux reversal to serve as an indicator of a data bit. If sufficient of the oxide coating 16 is removed to cause a significant change in flux density, the inventive purpose is accomplished. Therefore, the void 88 (FIG. 1) can be created either by means of a total removal of magnetic material and/or an incomplete or partial removal of magnetic material including the making of a cavity in magnetic material which does not amount to a complete "void", but which is sufficient to cause the desired difference in flux density between the void 88 and adjacent areas of the oxide coating 16. Furthermore, the void 88 could be created not by removing magnetic material, but rather by compressing (or embossing) it such as to render it incapable of attaining a significant magnetic flux field.

Various modifications may be made to the invention without altering its value or scope. For example, while the present inventive method has been described herein as being applied to a 5¼ inch floppy disk, it is equally applicable to other floppy disk types, rigid (Winchester) type disks, magnetic tape and other types of media such as magnetic strip cards. Similarly, the inventive method for creating non-erasable data on magnetic media by creating voids in the oxide coating of such data might well be accomplished by means of tools other than laser light, such as chemical means, high pressure embossing techniques (wherein material is compressed rather than removed), ultrasonic pulses, or other rapid heating or abrasive devices.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

Magnetic data storage media is widely used in the data processing industry. The predominant current usages are for the storage of program information and for the storage of variable data information. Magnetic media to which the inventive method for producing non-erasable data has been applied may be utilized in any application wherein conventional magnetic media are used. The main area of improvement is in the fact that disks containing non-erasable information according to the present invention cannot be altered as to the portions whereon such non-erasable information is placed, either intentionally or inadvertently.

One particular application in which such non-erasable data might be of particular benefit is in the production and use of alignment disks for calibrating disk drive units. Such alignment disks contain certain data which is used in the alignment of disk drive assemblies, including some data the physical location of which on the disk surface is of primary importance. Alignment disks are difficult and expensive to produce by conventional means, but they are a necessity in the industry. Unfortunately, alignment disks are often inadvertently erased. Even when alignment disks are not so erased, their usefulness wanes with usage, as field strengths weaken with age due to gradual exposure to imperfectly degaussed read/write heads. However, when alignment data is placed on a disk, according to the present inventive method, magnetic fields can easily be restored by simply exposing the medium to a magnetic field. An additional benefit in this application is derived from the fact that critical positioning of data on the alignment disks can be visually verified with the aid of a microscope when such data is written using the inventive method.

Of course, alignment disks are not the only application in which non-erasable data on magnetic media would be useful. For example, a non-erasable identification number on disks containing proprietary software would help to discourage unauthorized serial duplication. Another useful application would be to make unerasable those portions of a disk containing permanent program data on disks which are to be used to contain both such permanent program data as well as variable records.

Since the magnetic media with non-erasable data of the present invention may be readily constructed and entirely compatible with conventional equipment for read standard magnetically erasable data, it is expected that they will be acceptable in the industry as substitutes for the conventional magnetic media. For these and other reasons, it is expected that the utility and industrial applicability of the invention will be both significant in scope and long-lasting in duration.

We claim:

1. A method for inscribing a plurality of data bits onto a magnetic medium, the magnetic medium having a substratum layer and an oxide coating, the method comprising:

removing the oxide coating from a portion of the substratum layer thereby creating a void in the oxide coating; and magnetizing a remaining area of the oxide coating adjacent to said removed portion, such that, when the medium is moved past a read head, a change in a magnetic flux present at a first interface between the magnetized adjacent area and the void causes a current to be induced in a coil of the read head which current is interpreted by conventional read circuitry as one of the data bits, and further such that, when the medium is progressively moved further past the read head, a change in magnetic flux present at a second interface between the void and the magnetized adjacent area causes a current to be induced in the coil of the read head which current is interpreted by the conventional read circuitry as another of the data bits.

2. The method of claim 1, wherein:
the oxide coating is removed by focusing a laser beam on the magnetic medium such that the oxide coating is vaporized by heat created through the transfer of energy from the laser beam.

3. The method of claim 1, wherein:
the remaining area of the oxide coating is magnetized by exposing the magnetic medium to a magnetic field.

4. The method of claim 1, wherein:
the remaining area of the oxide coating is magnetized by writing to the remaining area in a conventional manner.

5. The method of claim 1, wherein:
the removal of the oxide coating is complete within the void, and none of the oxide coating remains within the void.

6. The method of claim 1, where:
the removal of the oxide coating is incomplete within the void, and a portion of the oxide coating remains within the void, provided that sufficient of the oxide coating is removed from the void to cause said change in said magnetic flux.

7. An improved magnetic data storage medium, including:
a substratum layer having a magnetic oxide coating including at least one cavity thereon such that, when the magnetic data storage medium is magnetized, a plurality of remaining portions of the magnetic oxide coating each retain a strong flux field while the cavities retain a weaker flux field such that, when the magnetic data storage medium is moved past a read head, the read head will detect a plurality of disruptions in flux density at a plurality of interfaces between the remaining portions and the cavities, and further wherein each of the plurality of disruptions represents a "one" data bit, the cavities being placed on the magnetic data storage medium such that an edge of the cavity is placed where a "one" data bit is required and no such edge is located where a "zero" data bit is required, the "zero" data bit being merely the absence of a "one" data bit.

8. The improved magnetic data storage medium of claim 7, wherein:
the disruptions are interpreted as data bits by conventional read circuitry.

9. The improved magnetic data storage medium of claim 7, wherein:
the magnetic data storage medium is a magnetic data storage disk and the cavities are located within at least one of a plurality of tracks, said tracks being concentric ring shaped areas on a surface of the magnetic data storage medium.

10. The improved magnetic data storage medium of claim 7, wherein:
the cavities are created by removing at least a portion of the magnetic oxide coating from at least one location on a surface of the magnetic data storage medium.

11. The improved magnetic data storage medium of claim 7, wherein:
the cavities are created by compressing the magnetic oxide coating within at least one location on a surface of the magnetic data storage medium.

12. A method for creating indelible data at selected sites on a surface of a magnetic medium, including:
a. positioning the medium such that it may be operated upon at selected locations by a tool; and
b. removing at least a portion of a magnetic material from the site with the tool;
c. magnetizing at least one adjacent portion of the surface adjacent to the sites such that a disruption in a magnetic field is created at an interface between the site and said adjacent portion;
wherein the indelible data is encoded in binary form with the interface between the site and said adjacent portion being such that it is readable by conventional magnetic medium data decoding apparatus wherein the disruption in the magnetic field is read as being a data bit.

13. The method of claim 12, wherein:
said adjacent portion is magnetized by exposing the magnetic data storage medium to a strong magnetic field.

14. The method of claim 12, wherein:
said adjacent portion is magnetized by a read/write head of a conventional magnetic data storage read/write apparatus.

15. The method of claim 12, wherein:
the tool is a laser head assembly and the magnetic material is removed from the site by focusing a laser beam onto the surface at the sites such that at least a portion of the magnetic material is vaporized.

16. The method of claim 15, wherein:
the medium is positioned on a movable stage such that the sites are at a focal point of the laser head.

17. The method of claim 16, wherein:
the focal point of the laser head is caused to move across the surface within the site.

18. The method of claim 17, wherein:
the magnetic medium is a rotating type magnetic data storage medium and the focal point of the laser head is caused to move radially across the surface within the site.

19. The method of claim 12, wherein:
the magnetic medium is a rotating type magnetic medium;
the medium is placed upon a rotating table, said rotating table being mounted upon a movable stage such that said rotating table may rotate in relation to said stage;
said movable stage is positioned by means of a plurality of positioning rails, said positioning rails being conventional means for positioning said movable stage which are rigidly attached to said stage and to a base, and slidably attached to each other such that said stage may be moved in at least one dimension in relation to said base;
said rotating table is rotated such that the site is located at a focal spot of a laser head assembly, said laser head assembly including a laser emitting means, a laser focusing means for focusing a laser beam at the focal spot, and a laser beam scanning means for scanning the laser beam across the site; and the laser beam is scanned across the site by said scanning means until at least a portion of the magnetic material is removed from the site by action of the laser beam upon the site.

* * * * *